March 2, 1965 H. F. FRITH, JR 3,171,272
SELVAGE-HUNG NET
Filed April 2, 1962 2 Sheets-Sheet 2
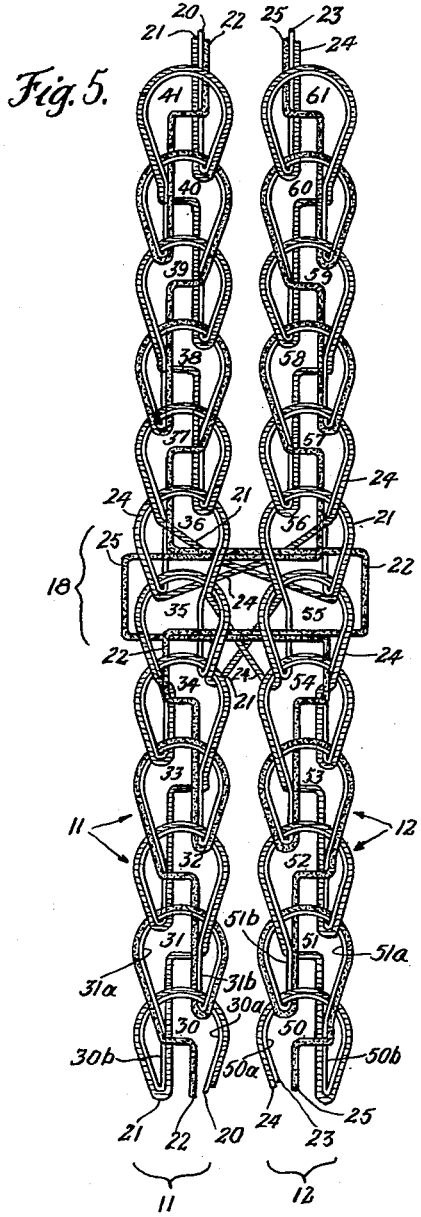
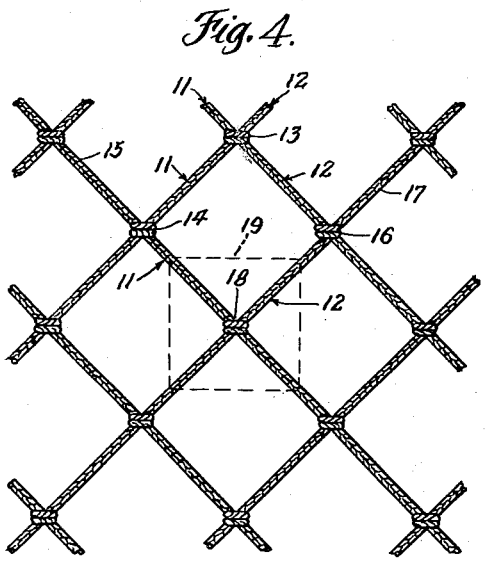
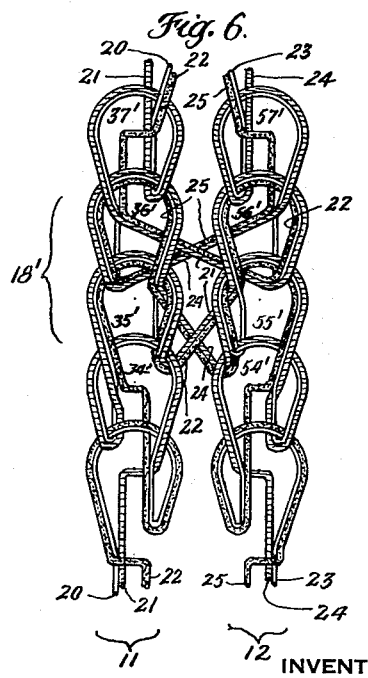
INVENTOR
Hagin Franklin Frith, Jr.
BY
ATTORNEYS

United States Patent Office 3,171,272
Patented Mar. 2, 1965

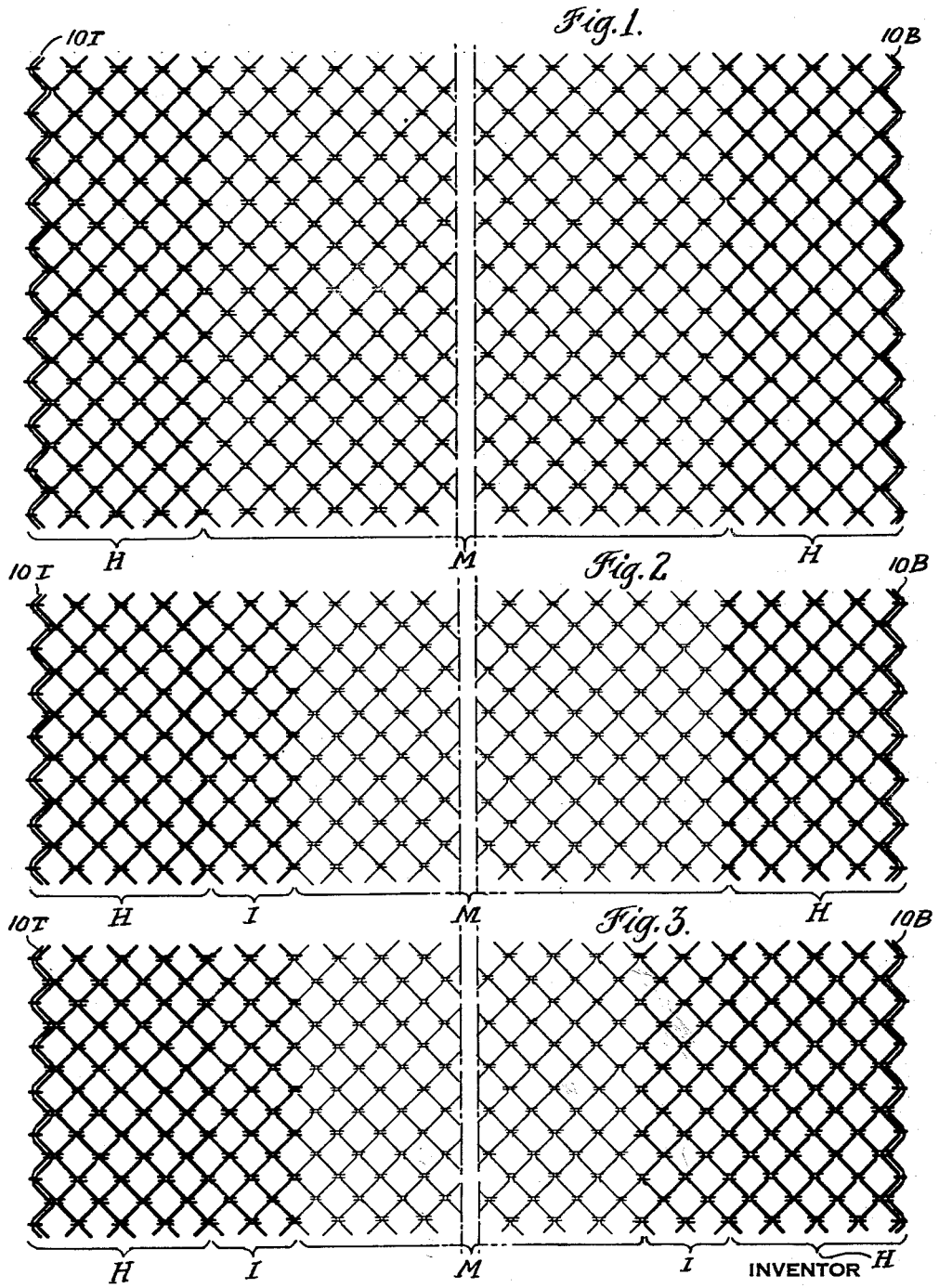

3,171,272
SELVAGE-HUNG NET
Hagin Franklin Frith, Jr., Willow Grove, Pa., assignor to Hagin Frith & Sons, Willow Grove, Pa., a partnership
Filed Apr. 2, 1962, Ser. No. 184,445
18 Claims. (Cl. 66—195)

This invention relates to deep-sea fish nets produced entirely or primarily by knitting, and has to do particularly with knitted nets so constructed that they may be used to best advantage with the warp chains extending lengthwise of the net. It has long been realized that if deep-sea fishing nets could be successfully produced by knitting operations, they would be less costly than is necessarily the case where the meshes must be individually tied. Furthermore, it has been realized that if a knitted fish net could be successfully produced from synthetic yarns having very high tensile strength in proportion to their size (diameter), the overall weight of the net could be very substantially reduced, as compared to nets formed of natural fiber yarns, such as cotton, the yarns of which must be of substantially greater size in order to afford equal strength.

In Patent No. 2,992,550, dated July 18, 1961, a knitted mesh is described which is preferably composed of synthetic high strength yarn, such as nylon, and which is particularly useful as the basic structure of a deep-sea fish net, such as is used, for example, in menhaden fishing. Although the mesh there disclosed is also useful in many types of net in which the warp chains extend horizontally, it is more effective in deep-sea fishing when the warp chains extend vertically, for when they are so disposed, the mesh opens out most readily and spreads most evenly. Consequently, where full and prompt spreading of the mesh is important, nets embodying the invention of the patent are customarily formed by cutting the mesh cross-wise of the warp into a number of panels, each of a length equal to the depth desired for the net in use, and lacing the panels to each other along their selvage edges, until the desired length of the net is reached.

The present invention is concerned in one of its primary aspects with the discovery of a form of knitted mesh which opens out fully and quickly even when hung from a selvage edge—that is, with the warp chains extending horizontally rather than vertically when the net is in use.

The invention also contemplates provision of a net of the type just mentioned, in which added weight (to resist wear and abrasion) and strength may be provided in selected warpwise zones or bands, by forming the meshes in such bands or zones of heavier or stronger yarns than are employed in other areas.

Other objectives of the invention include provision of a net which is very strong in proportion to its weight, and is capable of extremely severe service, over long periods of time. Another objective is to produce such a net at relatively low cost.

A still further objective is to provide a net which can be readily and compactly reeled up and stowed, without developing excessive bulk by reason of the increased thickness at the areas where the "knots" are formed. It will be understood that the term "knots" as used herein does not refer to knots tied in the ordinary sense, but to knots which consist entirely of knitted stitches.

Another quite important objective is to reduce the total weight of the net without any impairment of its strength, while still providing a structure in which a break in a mesh leg will not ravel beyond the nearest knot.

How these and other objects and advantages which may occur to those skilled in the art may be attained, will become apparent from the following description, and from the drawings which accompany it. In the drawings:

FIGURE 1 diagrammatically illustrates the preferred embodiment, having heavy selvage chains top and bottom, and four and one-half courses of heavy yarn immediately adjacent each selvage edge;

FIGURE 2 diagrammatically illustrates a construction similar to FIGURE 1, but in which intermediate courses of yarn of lighter weight than the very heavy selvage margin are employed at the top only of the net;

FIGURE 3 diagrammatically illustrates a net in which intermediate portions of medium weight are provided at both top and bottom of the net;

FIGURE 4 is an enlarged view of the opened mesh, showing the interknotting of the warp chains;

FIGURE 5 is a still further enlarged view of the portion enclosed in dotted lines in FIGURE 4; and FIGURE 6 illustrates, on a similarly enlarged scale, an alternative construction of the mesh knot.

In each of FIGURES 1, 2, and 3, it will be understood that most of the mid-portion of the net has been omitted. This will constitute by far the greater portion of the net itself, its size being limited only by the capacity of the machine. In these three figures, the double warp chain 10T forms the selvage edge at the top, and the corresponding chain 10B forms the selvage edge at the bottom, it being understood that the words "top" and "bottom" refer to the position which the net will occupy when it is actually in place in the ocean, and not the top and bottom of the sheet on which these figures are shown. The marginal portions of very heavy weight yarn are indicated by the letter H, the intermediate sections by the letter I, and the mid-portion, or main body of the net by the letter M. The difference in thickness of the yarns is indicated by the thickness of the lines used to diagrammatically illustrate them.

Although the bands of heavy mesh are shown as being four and one-half meshes wide, it will, of course, be apparent that they could be considerably wider, depending upon the requirements of the purchaser of the net. Similarly, the bands of intermediate meshes may be few in number or quite numerous. As a matter of fact, the preferred standard in the tied nets of the industry is not the four and one-half mesh heavy border shown in FIGURE 1, but a border which contains twenty-nine and one-half meshes, and the same net may have twenty-nine and one-half meshes of the heavy mesh border at the top and only four and one-half meshes at the bottom.

Some idea of the extent of the intermediate section may be gathered from the realization that although the drawing illustrates only twenty meshes in toto, a commercial net suitable for menhaden fishing, might well require a depth of from 900 to 1200 meshes, representing a measurement of 80 feet, in use.

Turning now to FIGURE 4, I have shown in somewhat enlarged form, but still diagrammatically, a section of the net having warp chains 11 and 12, which are united at the "knot" 13, and diverge therefrom, warp chain 11 extending to the left to unite, at knot 14, with warp chain 15, and warp chain 12 extending to the right to knot 16, where it engages warp chain 17. From knots 14 and 16, warp chains 11 and 12 again converge to form knot 18, which is illustrated in FIGURE 5. The portions of the warp chains which lie between the knots are referred to herein as the "legs" of the mesh.

FIGURE 5 illustrates, in greatly enlarged scale, the net shown within the dotted-line area 19 of FIGURE 4, but with the legs of the mesh in side-by-side relation, as knitted, rather than as spread for use, as in FIGURE 4.

It will be seen that the warp chain 11 comprises a series of loops, each knitted with the other. The primary member of the warp chain is the warp yarn 20, shown in outline. This is knitted with itself to form successive loops, in regular chain fashion, throughout the entire length of the net.

A second component of the warp chain is crossover yarn 21, shown as horizontally section-lined. This accompanies the warp yarn 20 in doubled relationship, being knitted into the first stitch 30 of the warp chain 11. But it is not knitted into the second loop 31 of that chain, being merely laid in through that loop. It is interknitted with the warp chain at stitch 32, is laid in at loop 33, and is interknitted at stitch 34, in the leg of the mesh.

A third component of the warp chain is lay-in yarn 22, indicated in stipple. This is laid in through loop 30, is interknitted with warp yarn 20 through stitch 31, is laid in through loop 32, is interknitted again in stitch 33, and is laid in in loop 34. It will thus be seen that the crossover yarn is interknitted with the warp chain at every alternate stitch, in the leg of the mesh, whereas the lay-in yarn is interknitted with the warp chain at stitches in between the alternate stitches interknitted with the crossover yarn. This pattern characterizes the legs (11, 12) of the mesh.

In the area of knit 18, however, the cross-over yarn 21, instead of being merely laid in at stitch 35, is interknitted with that stitch (even though it is also interknitted with the adjacent stitch 34) and is crossed and interlocked with one stitch of the same course in chain 12, interknitted with an adjacent stitch, and returned to warp chain 11, where it is interlocked in loop 36, and interknitted at stitch 37, from which point it is disposed in the alternate stitch arrangement of the mesh legs, being laid in through loop 38, then interknitted with stitch 39, laid in through loop 40, and interknitted with stitch 41.

In the area of the knot 18, the lay-in yarn 22, instead of being interknitted with loop 35, is interlocked with that loop and is crossed to the adjacent warp chain 12 where it is laid in entirely across one loop (55), extended through the adjacent loop 56 of chain 12 to loop 36 of warp chain 11. It is interlocked in that loop and laid in through loop 37, in the mesh leg, being alternately interknitted and laid in through stitches 38 and 39, respectively.

Considering warp chain 12: the warp yarn 23 is shown in outline, as is the warp yarn 20 in chain 11. It is disposed in precisely the same pattern as the warp yarn in chain 11, execpt for this very important difference. Whereas in stitch 30, formed in warp chain 11, the bight of the loop 30a lies to the right of the standing part 30b, in the corresponding stitch 50, the bight 50a lies to the left of the standing part 50b. In the adjacent course, the bight 31a of the loop 31 lies to the left of the standing part 31b, whereas the bight 51a of the loop 51 lies to the right of the standing part 51b. Similarly, in any given course through the warp chains forming the net, the bight of the loop in one chain will be disposed opposite to the bight of the corresponding loop of the adjacent chain, so that each warp chain becomes the mirror image rather than the counterpart of its neighbors.

The disposition of the loops is attained by so setting up the pattern chains of the knitting machine as to cause the guide bars carrying the yarns of one warp chain to knit to the right at every course where the bars which carry the yarns of the adjacent chain knit to the left, and vice versa.

This is a basic and important characteristic of the net of the present invention, to which I attribute, in part, the facility with which this net spereads its meshes to their fullest extent, even when hung from a selvage edge.

As the drawings clearly show, whether it be the crossover yarn or the lay-in yarn at any given stitch, that yarn is disposed side-by-side with the primary warp yarn, in what is sometimes referred to as "doubled" relationship.

The cross-over yarn 24 in warp chain 12 is disposed in the same pattern as the cross-over yarn 21 in chain 11, except that it also, like the warp yarns 20 and 23, is so handled that the respective chains form mirror images of each other. Yarn 24 in the mesh legs is interknitted with stitch 50, laid in through loop 51, interknitted with stitch 52, and so on.

In like manner, lay-in yarn 25 in the mesh legs is laid in through loop 50, is interknitted with stitch 51, is laid in through loop 52, and interknitted with stitch 53.

In the area of the knot 18, the cross-over yarn 24 is interknitted not only with stitch 54, but also with stitch 55, forming a part of the knot 18, and extends between stitch 54 in one course of chain 12 and loop 35 in an adjacent course of chain 11, being interlocked through the latter, and is interknitted with the adjacent stitch 36 in chain 11. It extends between loop 35 of chain 11 and loop 56 in an adjacent course of chain 12, with which stitch it is interlocked, and is interknitted with stitch 57 of the latter chain.

The lay-in yarn 25, in the vicinity of the knot 18, is interlocked with loop 55 of chain 12 and extends entirely across loop 35 in the same course of chain 11. It is also laid in through the adjacent loop 36 of chain 11, extending between that loop and loop 56 of the same course of chain 12, with which it is interlocked, and is laid in through loop 57. At loop 58, the lay-in yarn is interknitted with the warp yarn, and laid in through loop 59, interknitted at stitch 60, etc.

In forming the knot of FIGURE 5, it is highly desirable that the lay-in yarns should extend entirely across both chains, that is, from the bight of loop 35 to and through the bight of loop 55. This makes a much stronger knot than if these yarns were extended only between the adjacent portions (standing parts) of these loops. In order to ensure this pattern, it is necessary that there be an odd number of stitches in the legs of the mesh—that is, between the knots.

It will be observed that although the lay-in yarn and cross-over yarn form alternate stitches with the warp yarn throughout the legs of the meshes, there is a significant change in the knitting pattern in the locus of the knot 18. In that area, the cross-over yarn 21 is knitted with itself, chain fashion, at stitches 34 and 35 of chain 11. The converse is true of the lay-in yarn 22, which is laid in through loop 34, interlocked rather than knitted with loop 35, is crossed and laid in through loop 55, and returned as a lay-in through loop 56, being interlocked through stitch 36 and laid in through stitch 37. Throughout the remainder of the mesh leg, it uniformly alternates between lay-in loops and knitting stitches.

The same general pattern, in inverted form, applies to the warp chain 12.

One important characteristic of the knot pattern just described is the fact that each stitch of the knot interlocks two yarns. Thus it is possible to form a very tight knot, interlocking four yarns in only two courses of each chain.

FIGURE 6 illustrates a knot pattern which is somewhat different from that of FIGURE 5, in that both the lay-in yarns and the cross-over yarns are interknitted with stitches of at least two courses of stitches in the knot itself. Thus, in every stitch of the knot 18' a warp yarn, a lay-in yarn, and a cross-over yarn are knitted together, as it were in trebled relationship. Note that cross-over yarn 21 of chain 11, although knitted in stitch 34', is also knitted in stitch 35'. It is crossed between that stitch and stitch 55' of chain 12, with which stitch it is interlocked, and is knitted in, in stitch 56' of the adjacent course of chain 12. It is re-crossed from stitch 55' and interlocked with stitch 36' of its original chain 11, being interknitted with stitch 37'.

The lay-in yarn 22, in FIGURE 6, is laid in through loop 34' of chain 11, interknitted with warp yarn 20 and cross-over yarn 21 at stitch 35', and crossed, along with cross-over yarn 21, through stitch 55' with which it also interlocks, and is knitted at stitch 56' not only with warp yarn 23 but also with cross-over yarn 21. It is re-crossed between stitch 56′ and stitch 36′, together with cross-over yarn 21, being interlocked with stitch 36′ and laid in through stitch 37′.

The yarns forming chain 12, of FIGURE 6, are disposed in exactly the same manner in the knot 18′ as the yarns forming chain 11, except that they form mirror images of the pattern of chain 11.

The knot of FIGURE 6 can be produced with equal effectiveness whether the number of stitches in the leg of the mesh be odd or even.

In the structure of FIGURE 5 of the present application, the cross-over yarn 21 on one side of the knot 18 is disposed as a knitting stitch 34, and on the other side of knot 18 is not only interlocked through stitch 36, but also engages that stitch in forming the adjacent knitting stitch 37. The lay-in yarn on one side of the knot is interlocked through loops 34 and 35, and on the other side of the knot is interlocked through loop 36 and laid in through the adjacent loop 37. The interlocking of the lay-in yarn on both sides of the knot 18 is an important characteristic of this embodiment of the invention.

In FIGURE 6, both the lay-in yarn and he cross-over yarn form knititng stitches throughout the area of the knot 18′. That is to say, each of the four stitches constituting the knot is a knitting stitch containing all three of the yarns, even though the actual interconnection consists only of the lay-in and cross-over yarns. Either form produces a sufficiently strong knot, even though interengaging only two courses of the warp chains at each knot locus, instead of having to engage four courses, as in the patented structure.

This reduction in the number of courses incorporated in each knot is believed to be one reason for the free opening characteristic of the present net.

Although the knot shown in FIGURE 6 is stronger and even less subject to raveling than the knot shown in FIGURE 5, some difficulty may be experienced in using nets in which all knots are so constructed, for the presence of all three of the yarns in every stitch of each knot produces a bulkier knot, which may interfere with other knots, as between convolutions of the net when it is reeled up, thus causing increased abrasion and wear.

In order to obtain sufficient tightness in the knot, even though it embraces only two courses, it was believed necessary to increase the tension on the yarns at each knot area so as to hold the stitches more tightly together. With the net so constructed, it was found that a substantial drop in overall tensile strength developed after prolonged test. Analysis of this problem led to the view that the loss in tensile strength might well be attributed to the fact that each knot was under substantial internal stress, which caused gradual weakening of the knot as the net was alternately immersed in cold sea water, and then removed and spread upon the hot deck of a ship in full sunlight. It was found that this difficulty could be remedied by avoiding the use of extra tension in forming the knotting stitches, but that this could be done successfully only where the gauge of the needles was carefully selected with regard to the diameter of the yarns employed.

There is a very close coordination in these factors, leading to the formation of a knitting stitch in which each loop in the knot area is just small enough to engage snugly all of the yarn which traverses it.

This is not an absolute value, but approximate figures resulting from numerous tests may constitute a useful indication of the type of relationship which is presently believed to be desirable. Although the variety of synthetic yarns available is very large indeed, it is a fact that for practical purposes in the fish net industry, there are relatively few yarn structures which are commercially used. Several of the more important sizes are tabulated just below. The first column shows the twine number of the yarn, the second column the construction, the third column the total denier, and the fourth column the gauge presently believed to be best suited to each of the twine numbers listed.

| Twine Size | Construction | Total Denier | (Needles per inch) Gauge |
|---|---|---|---|
| No. 63-3 | 210D/3 Ends | 630 | 24 |
| No. 105-5 | 210D/5 Ends | 1,050 | 18 |
| No. 110-6 | 210D/4 Ends / 260D/1 End | 1,100 | 18 |
| No. 147-7 | 210D/7 Ends | 1,470 | 15 |
| No. 189-9 | 840D/2 Ends / 210D/1 End | 1,890 | 15 |
| No. 252-15 | 1050D/2 Ends / 420D/1 End | 2,520 | 12 |
| No. 294-18 | 1050D/2 Ends / 840D/1 End | 9,240 | 12 |
| No. 420-24 | 840D/5 Ends | 4,200 | 9 |
| No. 735-36 | 1050D/7 Ends | 7,350 | 6 |

The strength of the mesh should be about the same, on the average, as the theoretical tensile strength value of the yarns which form it. The formation of the knots should not significantly reduce this value.

However, if the mesh be knitted (by the way of example) from No. 110–6 yarns, using a twelve gauge needle assembly, considerable tension will have to be imposed by the needles in tying the knot.. Otherwise, a tight, non-raveling knot may not result, with a mesh formed in this way. Repeated immersion, followed by repeated drying, may produce a gradual but, cumulatively quite serious, loss of tensile strength. In contrast, if the same mesh is produced by using yarns of the same twine number—i.e., No. 110–6, but with an eighteen gauge needle assembly, then, even though the tension applied in forming the knot, is not significantly greater than that applied in normal knitting, a tight, non-ravelling knot will result and the initial tensile strength of the mesh will still be very close to the theoretical value for the yarn. Furthermore, repeated immersion and drying result in very little diminution of this value.

The yarn sizes noted above may be used in various combinations to provide the desired variation in weight as between the mid-section of the net and the bordering bands. A preferred relationship is represented by the use of Twine No. 147 to form the mid-section, Twine No. 189 in the intermediate bands, and Twine No. 252 along the selvage border.

Insofar as concerns the actual formation of the stitch pattern herein disclosed, little need be said. The conventional Raschel knitting machine is employed for this purpose. It is provided with separate warp beams, each handling a different weight of yarn. The very heavy yarns which form the outermost band or bands of the net are carried on warp beams right and left of the machine. The mid-weight yarns for intermediate courses if such are desired, are carried on warp beams nearer to the center. The primary yarns, which form by far the major, mid-portion of the net, are carried on a single central warp beam.

The body yarns are carried in six guide bars. However, in order to produce warp chains which are mirror images of each other, it is necessary to adjust the pattern chains in such a way as to cause three of these guide bars to knit in one direction, and three to knit in the opposite direction, at each course.

If the guide bars be thought of as being lettered in series from A to F, the three yarns which form the leg 11 of the mesh will be carried in guide bars A, C, E, which will all be driven at each course to knit in one direction. The yarns which form the adjacent leg 12 of the mesh will be carried on guide bars B, D. F, and these bars will be set to knit at each course in the opposite direction from that of the other group. The pattern chains will, of course, be adjusted to operate selectively when the region is reached for the tying of the knot. A seventh guide bar G may be used to tie together the first mesh leg and a chain end, and the last mesh leg and a chain end. An eighth guide bar H may be used to enhance the strength and appearance of the selvage edge, particularly where heavier yarns are used in the body.

Since anyone reasonably skilled in the use of this type of machine can adjust the mechanism in such a way as to accomplish this type of operation, once the desirability of doing so has been explained, no further discussion of the mechanism itself is believed to be necessary at this point.

Nevertheless, it is believed that not until the present invention was made had anyone appreciated or even imagined that by arranging the stitch pattern in the form herein disclosed, it would be possible to produce a fish net which would open evenly and readily when suspended from its weft edge, that is, with the warp chains running horizontally.

In the present case, as in the previous patent, the stitch pattern is such as to result in the use of the yarn components of the warp chains in different ratios. In forming the mesh shown in FIGURE 5, considerably more yarn is required to knit the continuous warp chain than is employed in producing the cross-over pattern, and the cross-over pattern uses more yarn than is employed in producing the lay-in pattern. In the knot illustrated in FIGURE 5, the ratio of the warp yarn component to the cross-over yarn component to the lay-in yarn component is 5.4 to 3.2 to 3.0. If the knot illustrated in FIGURE 6 is used, the lay-in and cross-over yarns will each be present in the ratio of 3.2 in proportion to 5.4 for the warp yarn. It is believed that the difference in ratio of the yarns employed in forming the knot plays an important part in establishing resistance to raveling, since, if there is a break in the mesh, the yarns cannot unravel together. One of them will ravel faster than the other, thereby producing a snag or snarl, and stopping the raveling, at the nearest knot.

Although each of the yarns employed in the knitting operation usually consist of several ends, it should be mentioned that, in every such instance, all of these ends are handled as one, in setting up and operating the machine.

It will be appreciated that many advantages are secured by the net construction herein shown and described. One of the outstanding advantages flows from the possibility of employing much heavier yarns in the mesh adjacent the upper edge (and, if desired, adjacent the lower edge also) than are employed for the major portion of the body of the net. It is possible in this way to build into the net all of the bulk necessary to withstand the chafing action due to movement of the floats at the upper edge and the weights at the bottom edge. Furthermore, these extremely sturdy bands increase tensile strength if the net is to be handled on power haul equipment. This solution to the problem of varying strength requirements is more facile and effective than could be secured where vertically hung panels were used. In that form of net, bands of border mesh, in which the warp chains ran horizontally, were laced into the upper and lower edges of the vertically-extending panels, in which the mesh opened in a direction at right angles to that of the meshes in the border bands.

Because the net can be hung from the selvage edge, very substantial saving in cost is obtained, by eliminating the necessity for lacing panels together, as was required for certain uses where the patented net was hung with the warp chains running vertically. It will be noted that since it is possible to use heavy yarn in the marginal portion and lighter yarn in the mid-portion, a substantial saving in yarn cost can be achieved as compared to the probable price if the entire mesh were made of the same heavy weight required to withstand wear and stress along the marginal edges. Furthermore, because of the reinforcement of the selvage edges, it is possible to eliminate entirely the application of a fabric binding strip along the edge from which the net is hung. Still further, the simplification of the structure of each mesh knot results in a very substantial reduction in the total weight of the net—on the order of 15%—without any impairment of its essential properties.

It is, of course, obvious that the net of the present invention can advantageously be used in many fields other than the field of deep-sea fishing. Tennis nets, badminton nets, netting for the baskets used in basketball, playpen netting, and various other uses come immediately to mind. But since the net of the present invention has outstanding advantages in the field of deep-sea fishing, it has been described in that environment.

I claim:

1. A knitted net adapted to be hung from a selvage edge, comprising a plurality of warp chains, each connected at spaced intervals along its length to an adjacent chain on one side and at intermediate intervals to an adjacent chain on the other side to form meshes, each of said warp chains comprising three constituent yarns, the first of which is chain-knitted on itself throughout the length of the chain, the second being knitted in doubled relationship with the first in spaced stitches of the chain between said points of connection, and the third being knitted in doubled relationship with the first in stitches intermediate the said spaced stitches of the chain, between said points of connection, the loops of any adjacent pair of chains being so disposed that in any given course in which the bight of one loop of the right-hand chain lies to the right of the standing part of that loop, the bight of the corresponding loop of the left-hand chain lies to the left of the standing part, and in any course in which the bight of the loop in the right-hand chain lies to the left of the standing part, the bight of the corresponding loop in the left-hand chain lies to the right of the standing part, the chains being united at the said points of connection by constituent yarns other than the continuous chain-knitted yarns.

2. A knitted net as defined in claim 1, wherein, at points of connection between said chains, the second of said yarn components in each of said chains is disposed as a lay-in yarn, interconnecting a stitch of its chain with a stitch in the same course of the adjacent chain, and interconnecting a stitch in an adjacent course of said adjacent chain with a stitch in the same adjacent course of its own chain.

3. A knitted net as defined in claim 1, wherein, at points of connection between said chains, the third of said constituent yarns in each of said chains is disposed as a cross-over yarn, interconnecting a stitch of its chain with a stitch in an adjacent course in the adjacent chain, and interconnecting said stitch last named with a stitch in an adjacent course of its own chain.

4. A knitted net as defined in claim 1, wherein, at points of connection between said chains, the second of said constituent yarns in each of said chains is disposed as a lay-in yarn interconnecting a stitch of its chain with a stitch in the same course of the adjacent chain, and interconnecting a stitch in an adjacent course of said adjacent chain with a stitch in the same adjacent course of its own chain, and the third of said yarn components in each of said chains is disposed as a cross-over yarn, interconnecting a stitch of its chain with a stitch in an adjacent course in the adjacent chain, and interconnecting said stitch last named with a stitch in an adjacent course of its own chain.

5. A knitted net as defined in claim 1, wherein at points of connection between said chains, the second and third of said constituent yarns in each of said chains are interknitted in trebled relationship with a stitch of the first constituent yarn in one course of their own chain, extend in doubled relationship back and forth between that chain and the adjacent chain, being interknitted in trebled relationship with a stitch of the first constituent yarn in an adjacent course of the adjacent chain and being interknitted, in trebled relationship, with a stitch of the first constituent yarn in the adjacent course of their own chain, the second and third component yarns of the adjacent chain being similarly disposed as mirror images of the chain first mentioned.

6. A knitted net composed of a plurality of warp chains, each of which comprises a warp yarn knitted upon itself to form a continuous series of loops, the loops of any one chain being formed as mirror images of the loops of the chains adjacent thereto, and knot-forming yarn elements, each interknitted at spaced intervals in each warp chain in doubled relationship with said warp yarn, the knot-forming yarn elements of a given chain being interconnected with loops of an adjacent chain at spaced intervals to form mesh knots between said chains and with loops of the other adjacent chain at intervals between the intervals first mentioned to form mesh knots with said other adjacent chain.

7. A knitted net of the construction defined in claim 6, wherein a double selvage yarn is knitted to the outermost warp chain at mesh-knot points along at least one margin of the mesh.

8. A knitted net of the construction defined in claim 6, wherein yarns in a mid-section of the mesh extending warpwise of the net are of lighter weight than yarns present in marginal areas extending warpwise thereof.

9. A knitted net according to claim 6, wherein the knot-forming elements of any chain are interconnected with two loops only of the adjacent chain.

10. A knitted net according to claim 9, wherein one of the knot-forming elements of each chain is interconnected with the other chain as a lay-in yarn, crossing from chain to chain in parallel courses.

11. A knitted net according to claim 9, wherein both of the knot-forming elements of each chain are disposed as cross-over yarns, both engaging a stitch of one course in their own chain, a stitch in an adjacent course of the adjacent chain, and a stitch in an adjacent course of their own chain.

12. A knitted net composed of a plurality of warp chains each of which comprises a warp yarn knitted upon itself to form a continuous series of loops and knot-forming yarn elements interknitted in doubled relationship with said warp yarn at spaced-apart stitches in the warp chain, the loops of any one chain being disposed as mirror images of the loops of the chains on either side thereof, and the knot-forming yarn elements of a given chain being interconnected with two loops only of an adjacent chain at spaced intervals to form mesh knots between said chains and with two loops only of the other adjacent chain at intervals between the intervals first mentioned to form mesh knots with said other adjacent chain, in which net, at least one of the constituent yarns comprises more than one end.

13. A knitted net according to claim 12, wherein the strength of the yarn present in meshes adjacent the marginal portions of the net is greater than the strength of the yarn present in other portions of the net.

14. A knitted net according to claim 12, wherein the total denier of any yarn present lies in a range between about 630 and 7350 denier.

15. A knitted net as defined in claim 12, wherein the total denier of any of the yarns present lies in a range between 630 and 7350, and in which the knitting gauge lies between about 24 at the lesser denier and about 6 at the greater denier, said net being characterized in that the mesh knots are substantially free of internal stress.

16. A knitted net composed of a plurality of warp chains each of which comprises a warp yarn knitted on itself to form a continuous series of loops, the loops of any one chain being formed as mirror images of the loops of the chains adjacent thereto, and each warp chain further comprising a second yarn component which is knitted with the warp yarn in doubled relationship in spaced-apart stitches of the warp chain, and a third yarn component which is knitted with the warp yarn in doubled relationship in spaced-apart stitches other than the stitches with which the second yarn component is knitted, said second and third yarn components extending to and fro at spaced intervals along the chain between the chain and an adjacent chain and constituting a mesh knot, in which knot the second component yarn is interknitted with two adjacent stitches of its chain, is interknitted with a stitch of an adjacent course of the adjacent chain, and interknitted with one stitch of an adjacent course of its own chain.

17. A net according to claim 16 in which the third yarn component at the mesh knot is laid in through said two adjacent loops formed by yarn of the second component, being interlocked in one of such loops, and is disposed as a lay-in yarn between the loop last named and a loop in the same course of the adjacent chain, further being interlocked with a loop of the adjacent course of said adjacent chain and interlocked with a loop of the same course of its own chain, and being disposed as a lay-in stitch through the adjacent loop of its own chain, the component yarns of the adjacent chain being similarly disposed but as mirror images of the yarns first mentioned.

18. A net according to claim 17, wherein the number of stitches in any run of a warp chain between knots is an odd number.

References Cited by the Examiner
UNITED STATES PATENTS

| | | | |
|---|---|---|---|
| 220,967 | 10/79 | Duboc | 66—195 |
| 1,234,927 | 7/17 | Myers et al. | 66—195 |
| 2,541,499 | 2/51 | Carney | 66—202 |
| 2,565,955 | 8/51 | Dobreff | 43—7 |
| 2,724,920 | 11/55 | Boehm | 43—12 |
| 2,814,899 | 12/57 | Brosius | 43—12 |
| 2,992,550 | 7/61 | Firth | 66—195 |
| 2,996,905 | 8/61 | Scheibe | 66—192 |

FOREIGN PATENTS

| | | |
|---|---|---|
| 396,112 | 1/09 | France. |
| 793,950 | 12/35 | France. |
| 1,227,475 | 3/60 | France. |
| 216,390 | 11/09 | Germany. |
| 476,868 | 5/29 | Germany. |
| 1,095,980 | 12/60 | Germany. |
| 2,607 | of 84 | Great Britain. |

RUSSELL C. MADER, *Primary Examiner.*